US011729341B2

(12) United States Patent
Nakajima

(10) Patent No.: US 11,729,341 B2
(45) Date of Patent: Aug. 15, 2023

(54) IMAGE FORMING APPARATUS, IMAGE FORMING METHOD, AND NON-TRANSITORY RECORDING MEDIUM

(71) Applicant: Takehiro Nakajima, Tokyo (JP)

(72) Inventor: Takehiro Nakajima, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/864,427

(22) Filed: Jul. 14, 2022

(65) Prior Publication Data

US 2023/0035041 A1 Feb. 2, 2023

(30) Foreign Application Priority Data

Jul. 30, 2021 (JP) .................................. 2021-125848

(51) Int. Cl.
*H04N 1/60* (2006.01)
(52) U.S. Cl.
CPC ......... *H04N 1/6019* (2013.01); *H04N 1/6008* (2013.01); *H04N 1/6033* (2013.01); *H04N 1/6075* (2013.01)
(58) Field of Classification Search
CPC .. H04N 1/6019; H04N 1/6008; H04N 1/6033; H04N 1/6075; H04N 1/6055
See application file for complete search history.

(56) References Cited

U.S. PATENT DOCUMENTS

| | | | | |
|---|---|---|---|---|
| 5,452,112 A | * | 9/1995 | Wan ..................... | H04N 1/6033 358/518 |
| 6,377,758 B1 | * | 4/2002 | OuYang ............. | H04N 1/00063 399/15 |
| 7,403,305 B2 | * | 7/2008 | Nakajima ............ | H04N 1/6033 358/1.9 |
| 10,038,825 B2 | * | 7/2018 | Sawada .............. | H04N 1/00801 |
| 10,356,281 B2 | * | 7/2019 | Yamashita ........... | H04N 1/6052 |
| 2013/0135635 A1 | * | 5/2013 | Nakamura ........... | H04N 1/6052 358/1.9 |
| 2013/0272606 A1 | * | 10/2013 | Nakamura ........... | H04N 1/6055 382/167 |
| 2014/0147041 A1 | * | 5/2014 | Brown ...................... | G06T 7/90 382/167 |
| 2015/0130829 A1 | * | 5/2015 | Aizaki ..................... | H04N 1/50 345/591 |

(Continued)

FOREIGN PATENT DOCUMENTS

| | | | | |
|---|---|---|---|---|
| JP | 2009-060390 | | 3/2009 | |
| JP | 2009060390 A | * | 3/2009 | ........... H04N 1/6075 |

(Continued)

*Primary Examiner* — Ted W Barnes
(74) *Attorney, Agent, or Firm* — Xsensus LLP

(57) ABSTRACT

An image forming apparatus includes: a scanner to read each of a first output product serving as a model and a second output product output from the image forming apparatus; a memory that stores a color conversion lookup table to be used when color conversion is performed from a RGB color system into a CMYK color system; and circuitry to correct the color conversion lookup table based on a number of pixels and an amount of change per hue, using read information on the first output product, and re-correct the corrected color conversion lookup table, using read information on the second output product.

10 Claims, 6 Drawing Sheets

(56) References Cited

U.S. PATENT DOCUMENTS

| | | | | |
|---|---|---|---|---|
| 2015/0130964 A1* | 5/2015 | Huang | .................. | H04N 23/88 |
| | | | | 348/223.1 |
| 2016/0239728 A1* | 8/2016 | Suzuki | ................. | G06K 15/027 |
| 2016/0248941 A1* | 8/2016 | Kella | .................... | G06F 3/1256 |
| 2016/0286094 A1* | 9/2016 | Sawada | ................ | H04N 1/6052 |
| 2016/0379099 A1* | 12/2016 | Togashi | .............. | H04N 1/6044 |
| | | | | 358/1.9 |
| 2017/0353627 A1* | 12/2017 | Yamada | ................... | G06T 5/20 |
| 2019/0387131 A1* | 12/2019 | Komatsu | .............. | H04N 1/6094 |
| 2020/0374419 A1* | 11/2020 | Liefferink | ............ | H04N 1/6005 |

FOREIGN PATENT DOCUMENTS

| | | |
|---|---|---|
| JP | 2011-197813 | 10/2011 |
| JP | 2011197813 A * | 10/2011 |
| JP | 2015-178970 | 10/2015 |

\* cited by examiner

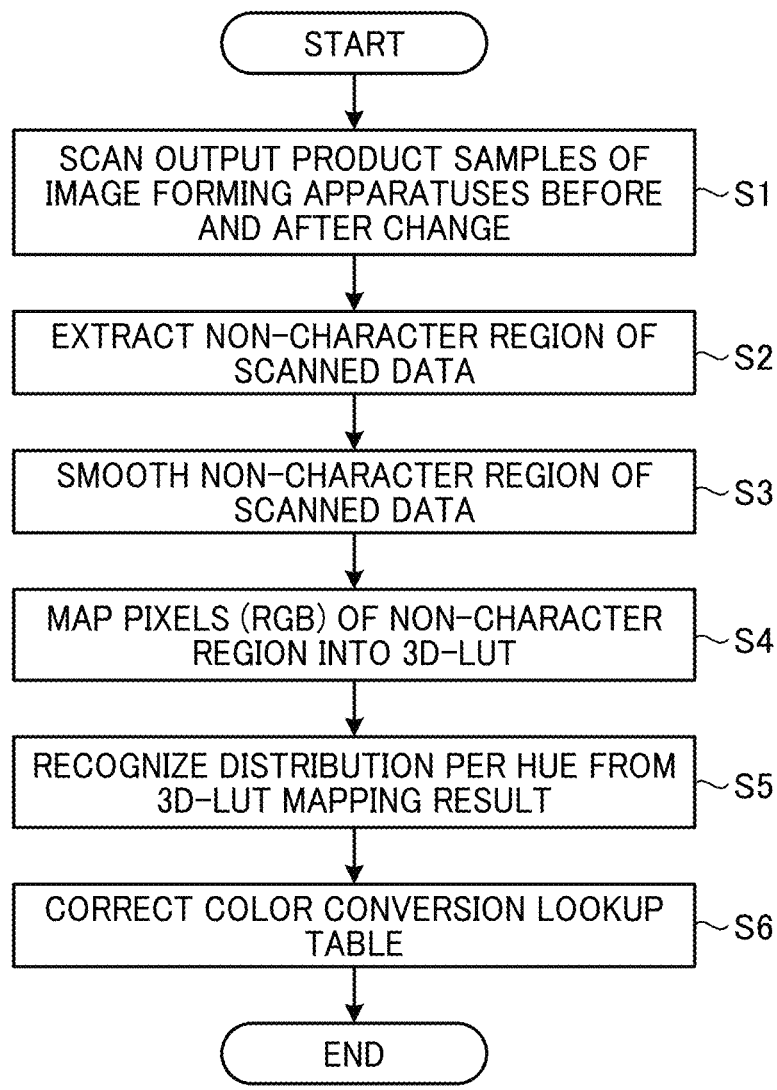

IMAGE FORMING APPARATUS, IMAGE FORMING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-125848, filed on Jul. 30, 2021, in the Japan Patent Office, the entire disclosure of which is hereby incorporated by reference herein.

BACKGROUND

Technical Field

The present disclosure relates to an image forming apparatus, an image forming method, and a non-transitory recording medium.

Description of the Related Art

In related art, when an image forming apparatus such as a newly purchased printer performs printing, fine density adjustment may be manually performed to obtain a color tone similar to the color tone of a printer that has been used.

There is also a technology that scans an output product serving as a model and executes parameter correction to bring a printer output of an RGB image in a memory card close to the color tone of the model. An RGB image has color components of red, green, and blue (RGB).

However, with the technique of the related art, extraction of a feature value and calculation of a correction parameter are required for each RGB image that is a target of color conversion, leading to disadvantages of troublesome parameter management and an increase in memory area. Moreover, with the technique of the related art, read RGB values are not corrected although readers of image data are different, leading to a disadvantage that it is not possible to determine overcorrection or the like.

SUMMARY

Example embodiments of the present disclosure include an image forming apparatus that includes a scanner that reads each of a first output product serving as a model and a second output product output from the image forming apparatus; a memory that stores a color conversion lookup table to be used when color conversion is performed from a RGB color system into a CMYK color system; and circuitry that corrects the color conversion lookup table based on a number of pixels and an amount of change per hue, using read information on the first output product, and re-corrects the corrected color conversion lookup table, using read information on the second output product.

Example embodiments of the present disclosure include an image forming method performed by an image forming apparatus. The image forming method includes storing in a memory a color conversion lookup table to be used when color conversion is performed from a RGB color system into a CMYK color system; reading each of a first output product serving as a model and a second output product output from the image forming apparatus; and correcting the color conversion lookup table. The correcting includes correcting the color conversion lookup table based on a number of pixels and an amount of change per hue, using read information on the first output product; and re-correcting the corrected color conversion lookup table, using read information on the second output product.

Example embodiments of the present disclosure include a non-transitory recording medium storing a plurality of instructions which, when executed by one or more processors, causes the processors to perform an image forming method. The image forming method includes storing, in a memory, a color conversion lookup table to be used when color conversion is performed from a RGB color system into a CMYK color system; reading each of a first output product serving as a model and a second output product output from the image forming apparatus; and correcting the color conversion lookup table. The correcting includes correcting the color conversion lookup table based on a number of pixels and an amount of change per hue, using read information on the first output product; and re-correcting the corrected color conversion lookup table, using read information on the second output product.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2 is a flowchart schematically presenting a flow of a correction process on a color conversion lookup table;

Figure 1:
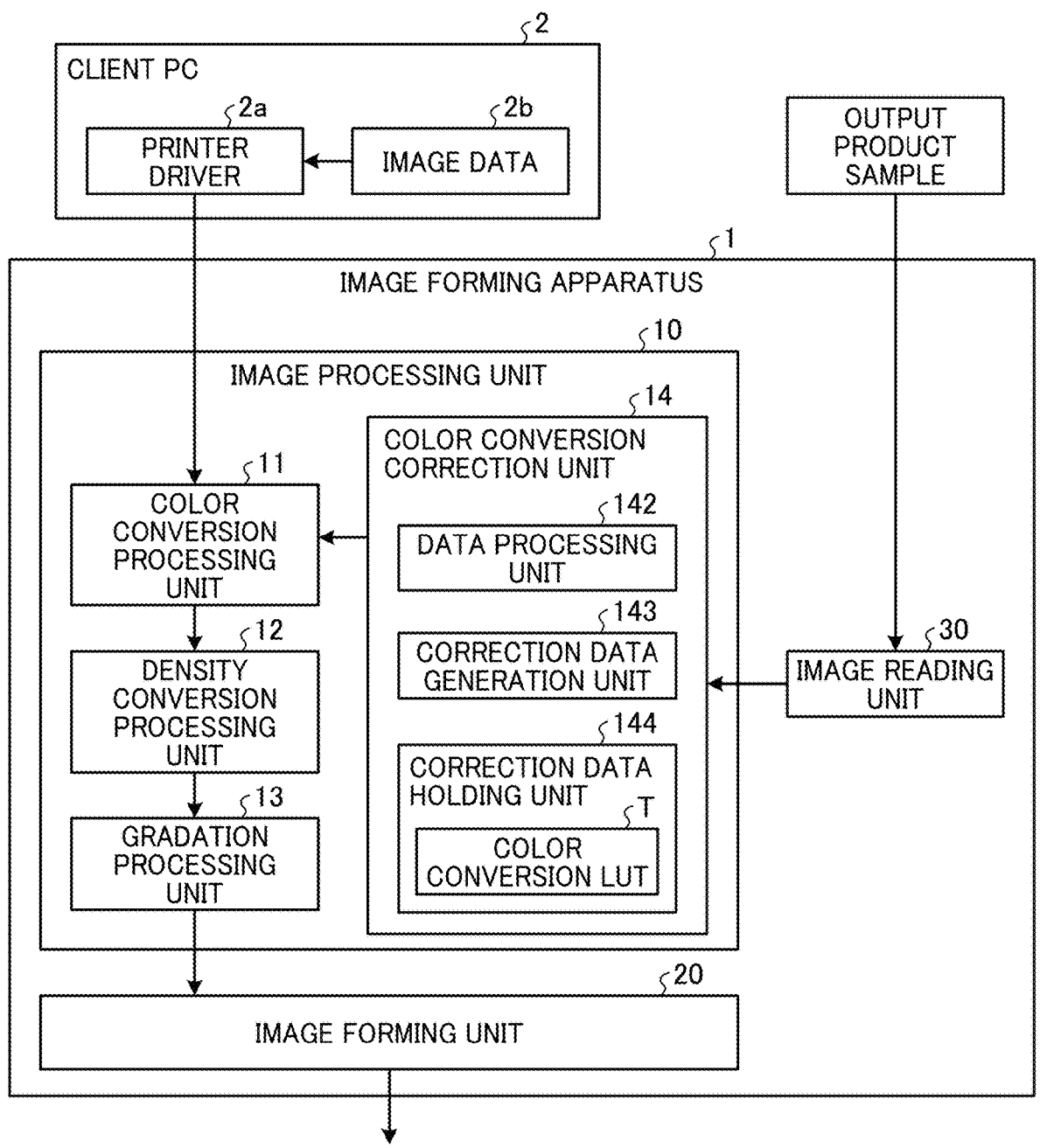
FIG. 1 is a block diagram illustrating a functional configuration of an image forming apparatus according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Referring now to the drawings, embodiments of the present disclosure are described below. As used herein, the singular forms "a", "an", and "the" are intended to include the plural forms as well, unless the context clearly indicates otherwise.

Hereinafter, embodiments of an image forming apparatus, a program, and an image forming method are described in detail referring to the accompanying drawings. Hereinafter, an example in which the image forming apparatus according to the present embodiment is applied to a multifunction peripheral is described. In the present embodiment, a process is described in a case where the color tone of a print result of a newly purchased image forming apparatus after replacement is changed into a color tone similar to the color tone of an image forming apparatus before the replacement that has been used until then.

FIG. 1 is a block diagram illustrating a functional configuration of an image forming apparatus 1 according to an embodiment. As illustrated in FIG. 1, a client personal computer (PC) 2 is coupled to the image forming apparatus 1. The client PC 2 outputs image data 2b of colors of RGB to the image forming apparatus 1 via a printer driver 2a. The printer driver 2a adds information such as a resolution to image data 2b when the image data 2b is printed, and outputs the image data with the information added to the image forming apparatus 1.

As illustrated in FIG. 1, the image forming apparatus 1 includes an image processing unit 10, an image forming unit 20, and an image reading unit 30.

The image processing unit 10 performs various processes, such as a color conversion process, a density conversion process, and a gradation process, on the image data 2b input from the client PC 2, and outputs the processed image data to the image forming unit 20.

The image forming unit 20 mainly includes a printer. Based on image data of each color of cyan, magenta, yellow, and black (CMYK) processed by the image processing unit 10, the image forming unit 20 forms an image of each color corresponding to the image data of the corresponding color on a recording medium. Also, based on the image data of each color of CMYK processed by the image processing unit 10, the image forming unit 20 forms a sample image on a recording medium (for example, a print sheet or a transfer belt), and outputs the recording medium (output product sample) with the sample image formed to a reading window. The image reading unit 30 performs image reading through the reading window.

The image reading unit 30 mainly includes a scanner, reads the recording medium (output product sample) with the sample image formed, and outputs the read image data to the image processing unit 10.

The image processing unit 10 performs a correction process on a color conversion lookup table (LUT) T (described later) using the recording medium (output product sample) with the sample image formed input from the image reading unit 30.

Functions of the image processing unit 10 are described next in more detail. As illustrated in FIG. 1, the image processing unit 10 includes a color conversion processing unit 11, a density conversion processing unit 12, a gradation processing unit 13, and a color conversion correction unit 14. The color conversion correction unit 14 includes a correction data holding unit 144 serving as a memory. The correction data holding unit 144 stores a color conversion lookup table T.

The color conversion lookup table T is a three-dimensional lookup table, and stores a parameter to be used when color conversion is performed from RGB data (RGB color system) into CMYK data (CMYK color system).

The color conversion processing unit 11 performs a color conversion process on image data 2b of each color of RGB input from the client PC 2 using the color conversion lookup table T of the correction data holding unit 144 in the color conversion correction unit 14 to convert the image data 2b of each color of RGB into image data of each color of CMYK. Specifically, the color conversion processing unit 11 performs color conversion to reproduce the color tone of displaying on the monitor of the client PC 2 using color materials of the image forming apparatus 1.

The density conversion processing unit 12 performs a density conversion process on the image data after the color conversion process. Specifically, the density conversion processing unit 12 performs density conversion on the image data input from the color conversion processing unit 11 for each color of CMYK. More specifically, the density conversion processing unit 12 performs density conversion to accommodate the individual difference of the image forming apparatus 1.

The gradation processing unit 13 converts the image data of each color of CMYK after the density conversion process into image data with the number of gradations corresponding to the gradation processing capability of the image forming unit 20. Specifically, the gradation processing unit 13 determines dot arrangement at the time of image formation, and transmits the dot arrangement to the image forming unit 20.

The color conversion correction unit 14 performs the correction process on the color conversion lookup table T using data of an output product sample of the image forming apparatus before the replacement read by the image reading unit 30 and data of an output product sample of the image forming apparatus 1 after the replacement read by the image reading unit 30.

The function of the color conversion correction unit 14 is described next in more detail. As illustrated in FIG. 1, the color conversion correction unit 14 includes a data processing unit 142, a correction data generation unit 143, and the correction data holding unit 144 that stores the above-described color conversion lookup table T.

The data processing unit 142 analyzes the data of the output product sample of the image forming apparatus before the replacement read by the image reading unit 30 and the data of the output product sample of the image forming apparatus 1 after the replacement read by the image reading unit 30.

The correction data generation unit 143 changes and corrects the color conversion lookup table T based on the analysis of the data processing unit 142, and stores the changed and corrected color conversion lookup table T in the correction data holding unit 144.

The correction process on the color conversion lookup table T in the image forming apparatus 1 is described next in detail.

FIG. 2 is a flowchart schematically presenting a flow of the correction process on the color conversion lookup table T.

As illustrated in FIG. 2, the image reading unit 30 scans and reads an output product sample (a first output product serving as a model) of the image forming apparatus before the replacement and an output product sample (a second output product) of the image forming apparatus 1 after the replacement (step S1).

Then, the data processing unit 142 extracts a region other than a character region from the scanned data (step S2). More particularly, a character region tends to have a large amount of change with respect to white paper and has a strong edge as of a black character. Hence, the data processing unit 142 extracts a character region and a non-character region in accordance with the tendency.

Then, after extracting the non-character region, the data processing unit 142 performs a smoothing process on the pixels of the scanned data (step S3). More particularly, the data processing unit 142 performs the smoothing process to reduce the influence of noise at the time of reading.

Then, after the smoothing process, the correction data generation unit 143 maps pixel values (RGB values: first feature values) of the scanned data of the output product sample of the image forming apparatus before the replacement and pixel values (RGB values: second feature values) of the scanned data of the output product sample of the image forming apparatus 1 after the replacement into a three-dimensional lookup table (3D-LUT) (step S4), and recognizes the distribution of the input pixel values per hue (step S5).

Figure 3A:
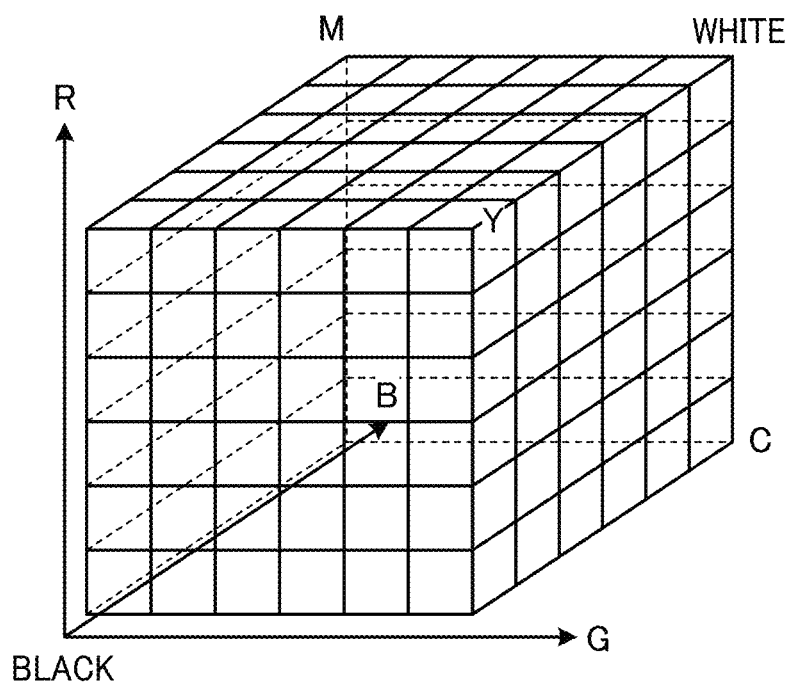
FIGS. 3A and 3B are diagrams conceptually illustrating three-dimensional lookup tables.
Figure 3B:
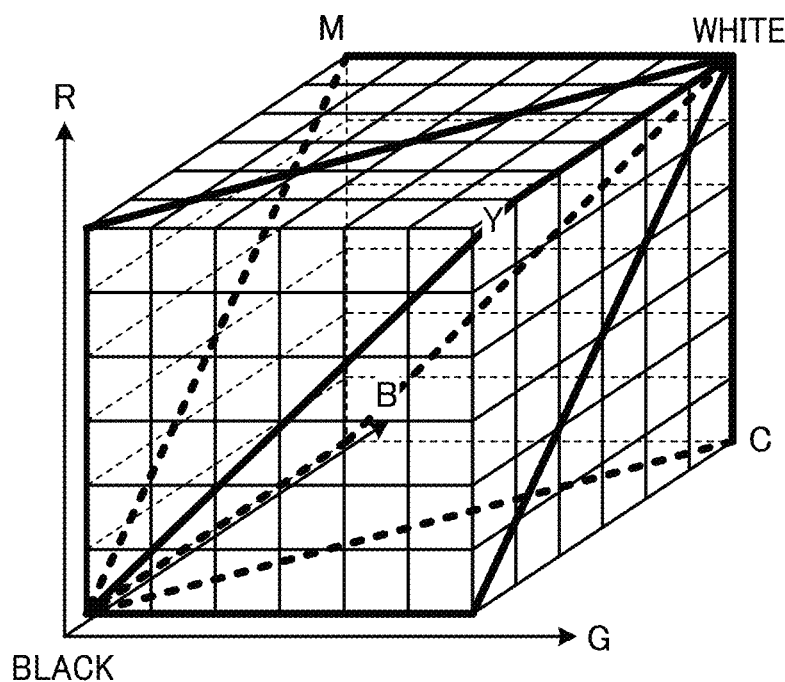

FIGS. 3A and 3B are diagrams conceptually presenting a three-dimensional lookup table (3D-LUT). As illustrated in FIG. 3A, when the 3D-LUT is based on the RGB color space, the 3D-LUT has a solid structure having three-dimensional axes in an R direction, a G direction, and a B direction. When each of RGB has 8 bits, a color of R=G=B=0 represents black, and a color of R=G=B=255 represents white. When the 3D-LUT is equally divided by units of a desirable value of 2 or more and lattice points serve as representative points, the amount of data can be reduced and a value that is not on a lattice point can be calculated by interpolation computation.

As illustrated in FIG. 3B, lines connecting white with respect to R, G, B, C, M, and Y, and lines connecting R, G, B, C, M, and Y with respect to black represent a system of colors of R, G, and B, and a system of colors of C, M, and Y. Desirable RGB values are plotted on the 3D-LUT to recognize the hue. In FIG. 3B, a reference point for a hue may be provided between R and Y to increase the number of sections of hues.

Then, the correction data generation unit 143 calculates a difference or the like from the distribution of input pixel values per hue before the replacement and the distribution of input pixel values per hue after the replacement, and corrects the color conversion lookup table T held in the image forming apparatus 1 after the replacement (step S6). The color conversion lookup table T has a structure of 3D-LUT; however, the 3D-LUT used in step S4 is used for recognizing the distribution of pixel values and calculating the difference, and hence is different from the color conversion lookup table T.

Figure 4:
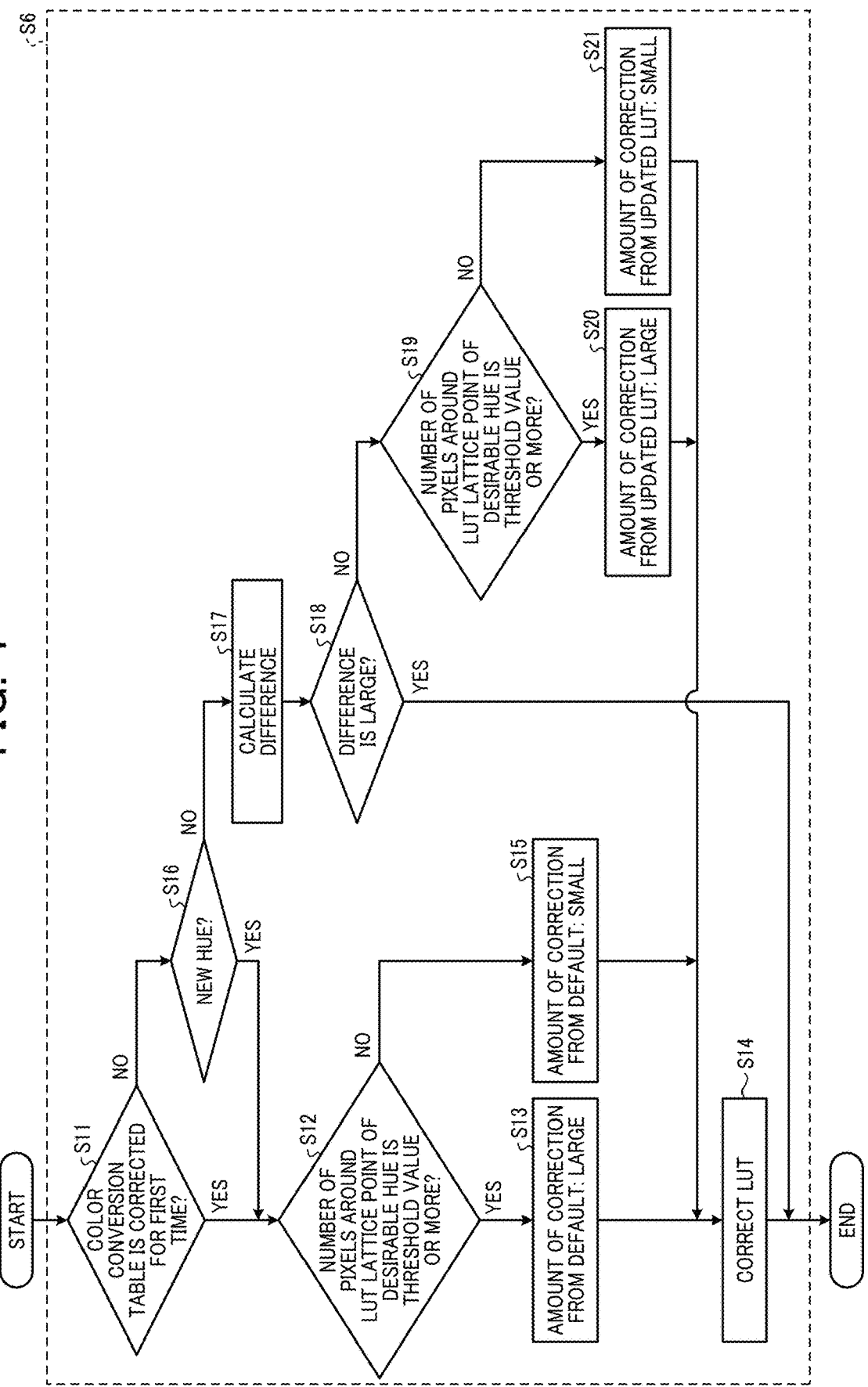
FIG. 4 is a flowchart presenting in detail the flow of the correction process on the color conversion lookup table.

The correction process on the color conversion lookup table by the correction data generation unit 143 is described in detail. FIG. 4 is a flowchart presenting in detail the flow of the correction process on the color conversion lookup table.

As illustrated in FIG. 4, the correction data generation unit 143 determines whether correction on the color conversion lookup table T is performed for the first time (step S11).

When the color conversion lookup table T is corrected for the first time (Yes in step S11), the correction data generation unit 143 determines whether the number of pixels around the 3D-LUT lattice point of a desirable hue is a threshold value or more (step S12).

When the number of pixels around the 3D-LUT lattice point of the desirable hue is the threshold value or more (Yes in step S12), the correction data generation unit 143 increases the amount of correction for a color conversion lookup table T (referred to as an initial color conversion lookup table T) held in the image forming apparatus 1 after the replacement (step S13), and corrects the color conversion lookup table T (step S14).

When the number of pixels around the 3D-LUT lattice point of the desirable hue is less than the threshold value (No in step S12), the correction data generation unit 143 decreases the amount of correction for a color conversion lookup table T (referred to as an initial color conversion lookup table T) held in the image forming apparatus 1 after the replacement (step S15), and corrects the color conversion lookup table T (step S14).

Since information is considered to be highly reliable as the number of target pixels increases, the correction data generation unit 143 performs control to increase the amount of correction as the number of target pixels increases to bring the color tone close to the color tone of the image forming apparatus before the replacement.

In contrast, when the correction of the color conversion lookup table T is not the first correction (No in step S11), the correction data generation unit 143 determines whether the input data includes a new (uncorrected) hue (step S16).

When the input data includes a new (uncorrected) hue (Yes in step S16), the correction data generation unit 143 determines the amount of correction in accordance with the determination with the threshold value on the number of pixels in step S12.

When the input data does not include a new (uncorrected) hue (No in step S16), the correction data generation unit 143 determines whether correction is to be performed for the target hue in the updated color conversion lookup table T.

Specifically, the correction data generation unit 143 calculates the difference between the initial color conversion lookup table T and the updated color conversion lookup table T (step S17).

When the difference is larger than a predetermined value (Yes in step S18), the correction data generation unit 143 considers that the performed correction is already sufficient, and ends the process without performing the correction on the color conversion lookup table T. Accordingly, the degree of change in the target hue can be recognized, and hence overcorrection can be prevented.

When the difference is smaller than the predetermined value (No in step S18), the correction data generation unit 143 determines whether the number of pixels around the 3D-LUT lattice point of the desirable hue is a threshold value or more (step S19).

When the number of pixels around the 3D-LUT lattice point of the desirable hue is the threshold value or more (Yes in step S19), the correction data generation unit 143 increases the amount of correction from the updated color conversion lookup table T (step S20). As described above, the reason why the amount of correction from the updated color conversion lookup table T is increased when the number of pixels around the 3D-LUT lattice point of the desirable hue is the threshold value or more is that newly acquired data is considered to be highly reliable. Thus, accuracy of the color conversion lookup table T can be increased when the number of references is large.

In contrast, when the number of pixels around the 3D-LUT lattice point of the desirable hue is less than the threshold value (No in step S19), the correction data generation unit 143 decreases the amount of correction from the updated color conversion lookup table T (step S21). Thus, overcorrection when the number of references is small can be prevented.

Figure 5A:
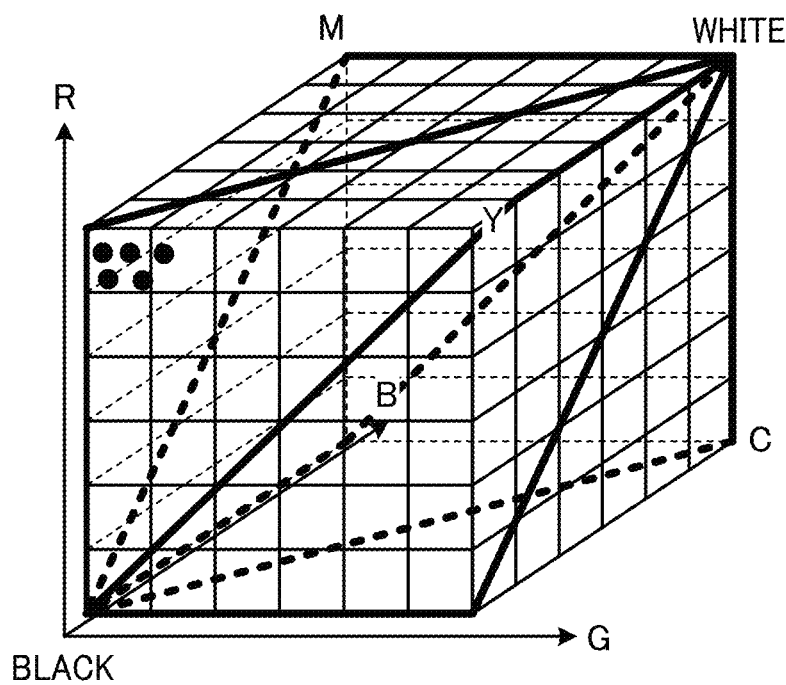
FIGS. 5A and 5B are diagrams illustrating an example of distributions of RGB when an image reading unit reads output product samples of an image forming apparatus before replacement and an image forming apparatus after the replacement.
Figure 5B:
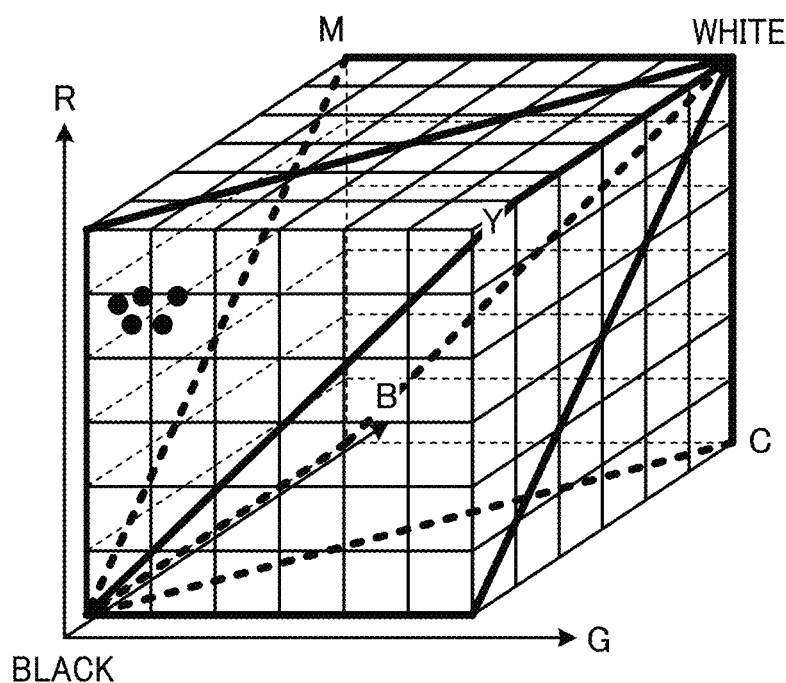

FIGS. 5A and 5B are diagrams illustrating an example of distributions of RGB when the image reading unit 30 reads output product samples of the image forming apparatus before the replacement and the image forming apparatus 1 after the replacement. FIG. 5A presents the example of the distribution of RGB when the image reading unit 30 reads the output product sample of the image forming apparatus before the replacement. FIG. 5B presents the example of the distribution of RGB when the image reading unit 30 reads the output product sample of the image forming apparatus 1 after the replacement. As illustrated in FIGS. 5A and 5B, since the values of R of the image forming apparatus before the replacement are distributed in a direction in which the value of R increases, it is found that the color conversion lookup table T of the image forming apparatus 1 after the replacement is also to be corrected in the direction in which the output value of R increases.

As described above, according to the present embodiment, when the print result of the newly purchased image forming apparatus 1 after the replacement is changed to have a color tone similar to the color tone of the image forming apparatus before the replacement that has been used until then, it is not required to hold the color conversion lookup table for each image data, and overcorrection due to color matching with a specific image is prevented, thereby simplifying the procedure of density adjustment.

More particularly, when the color conversion lookup table T of the image forming apparatus 1 is corrected, correction is performed based on the number of pixels and the amount of change per hue using scanner read information on a desirable image (output product sample), and the corrected color conversion lookup table T is re-corrected using scanner read information on another image (output product sample). Accordingly, the color conversion lookup table T is generated without extraction of a feature value and calculation of a correction parameter for each RGB image that is a target of color conversion, and overcorrection due to specialization for a specific RGB image can be prevented.

Figure 6:
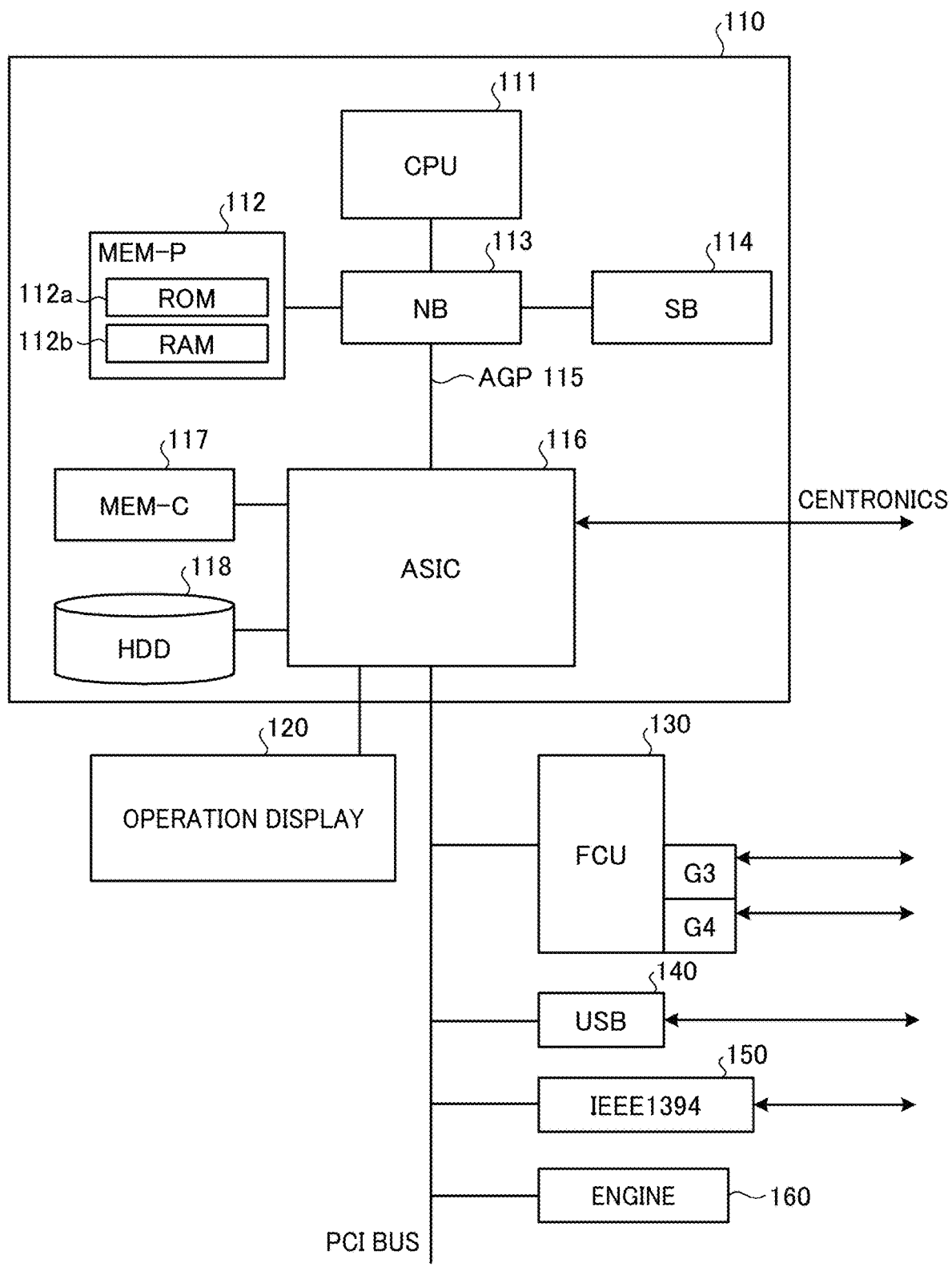
FIG. 6 is a block diagram illustrating an example of a hardware configuration when the image forming apparatus according to the present embodiment is applied to a multi-function peripheral.

FIG. 6 is a block diagram illustrating an example of a hardware configuration when the image forming apparatus 1 according to the present embodiment is applied to a multifunction peripheral. As illustrated in FIG. 6, the multifunction peripheral includes a controller 110 and an engine 160 that are coupled to each other via a peripheral component interconnect (PCI) bus. The controller 110 controls the entire multifunction peripheral, drawing, communication, and input from an operation unit. The engine 160 is a printer engine or the like that can be coupled to the PCI bus, and is, for example, a black-and-white plotter, a one-drum color plotter, a four-drum color plotter, a scanner, or a fax unit. The engine 160 also includes an image processing section that performs image processing such as error diffusion and gamma conversion, in addition to an engine section such as a plotter.

The controller 110 includes a central processing unit (CPU) 111, a north bridge (NB) 113, a system memory (MEM-P) 112, a south bridge (SB) 114, a local memory (MEM-C) 117, an application specific integrated circuit (ASIC) 116, and a hard disk drive (HDD) 118. The NB 113 and the ASIC 116 are coupled to each other via an accelerated graphics port (AGP) bus 115. The MEM-P 112 further includes a read only memory (ROM) 112*a* and a random access memory (RAM) 112*b*.

The CPU 111 performs overall control of the multifunction peripheral, includes a chip set including the NB 113, the MEM-P 112, and the SB 114, and is coupled to other devices via the chip set.

The NB 113 is a bridge that couples the CPU 111 to the MEM-P 112, the SB 114, and AGP bus 115, and includes a memory controller that controls reading and writing from and to the MEM_P 112, a PCI master, and an AGP target.

The MEM-P 112 is a system memory used as a memory for storing a program and data, a memory for deploying a program and data, a memory for drawing of a printer, or the like, and includes the ROM 112*a* and the RAM 112*b*. The ROM 112*a* is a read only memory used as a memory for storing a program and data. The memory RAM 112*b* is a writable and readable memory used as a memory for deploying a program and data, a memory for drawing of a printer, or the like.

The SB 114 is a bridge for coupling the NB 113 to a PCI device and a peripheral device. The SB 114 is coupled to the NB 113 via the PCI bus. A network interface (I/F) or the like is also coupled to the PCI bus.

The ASIC 116 is an integrated circuit (IC) for use of image processing including a hardware element for image processing, and serves as a bridge that couples the AGP bus 115, the PCI bus, the HDD 118, and the MEM-C 117 to each other. The ASIC 116 includes a PCI target and an AGP master, an arbiter (ARB) serving as a core of the ASIC 116, a memory controller that controls the MEM-C 117, a plurality of direct memory access controllers (DMACs) that rotate image data using hardware logic or the like, and a PCI unit that transfers data to and from the engine 160 via the PCI bus. A fax control unit (FCU) 130, a Universal Serial Bus (USB) 140, an interface 150 of Institute of Electrical and Electronics Engineers (IEEE) 1394 are coupled to the ASIC 116 via the PCI bus. An operation display 120 is directly coupled to the ASIC 116.

The MEM-C 117 is a local memory to be used as a copy image buffer or a code buffer. The HDD 118 is a storage for storing image data, programs, font data, and forms.

The AGP bus 115 is a bus interface for a graphics accelerator card and is proposed for speeding up graphic processing. The AGP bus 115 can speed up the graphics accelerator card by directly making an access to the MEM-P 112 with high throughput.

A program to be executed by the image forming apparatus 1 according to the present embodiment is provided by being incorporated in advance in a ROM or the like. The program to be executed by the image forming apparatus 1 according to the present embodiment may be stored in any computer-readable recording medium, such as a compact disc-read only memory (CD-ROM), a flexible disk (FD), a compact disc-recordable (CD-R), a digital versatile disk (DVD), or the like, in a file format installable or executable by the computer, for distribution.

In one example, the program to be executed by the image forming apparatus 1 according to the present embodiment may be stored in a computer connected to a network such as the Internet and may be provided by being downloaded via the network, for distribution. In another example, the program to be executed by the image forming apparatus 1 according to the embodiment may be provided or distributed via a network such as the Internet.

The program to be executed by the image forming apparatus 1 according to the present embodiment has a module configuration including the components (the color conversion processing unit 11, the density conversion processing unit 12, the gradation processing unit 13, and the color conversion correction unit 14) of the image processing unit 10 described above, and as actual hardware, a CPU (processor) reads the program from a ROM and executes the program to load the components into a main storage device and generate the color conversion processing unit 11, the density conversion processing unit 12, the gradation processing unit 13, and the color conversion correction unit 14 in the main storage device.

While the image forming apparatus 1 according to the embodiment of the disclosure is applied to the multifunction peripheral having at least the printer function (the image forming unit 20) and the scanner function (the image reading unit 30) among the copier function, the printer function, the scanner function, and the facsimile function, the image forming apparatus 1 may be applied to any of a copier, a printer, and a facsimile apparatus as long as the image forming apparatus has the printer function and the scanner function.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above. The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:
a scanner configured to read each of a first output product serving as a model and a second output product output from the image forming apparatus;
a memory that stores a color conversion lookup table to be used when color conversion is performed from a RGB color system into a CMYK color system; and
circuitry configured to
correct the color conversion lookup table based on a number of pixels and an amount of change per hue, using read information on the first output product, and
re-correct the corrected color conversion lookup table, using read information on the second output product.

2. The image forming apparatus according to claim 1, wherein the circuitry is configured to
acquire a first feature value from the read information on the first output product, and
project the first feature value into a three-dimensional lookup table, determine whether a number of pixels around a lattice point of a three-dimensional lookup table in a desirable hue is a threshold value or more, and determine an amount of correction for the initial color conversion lookup table based on a result of the determination with the threshold value.

3. The image forming apparatus according to claim 2, wherein the circuitry is configured to
in a case that the read information on the second output product input after the correction of the color conversion lookup table includes an uncorrected hue, determine an amount of correction for the color conversion lookup table based on the result of the determination with the threshold value.

4. The image forming apparatus according to claim 2, wherein the circuitry is configured to
in a case that the read information on the second output product input after the correction of the color conversion lookup table does not include an uncorrected hue, calculate a difference between the initial color conversion lookup table and the updated color conversion lookup table, and
determine execution of the correction of the color conversion lookup table based on the difference.

5. The image forming apparatus according to claim 4, wherein the circuitry is configured to
in a case that the difference is larger than a predetermined value, control not to change the color conversion lookup table.

6. The image forming apparatus according to claim 4, wherein the circuitry is configured to
acquire a first feature value from the read information on the first output product,
acquire a second feature value from the read information on the second output product, and
in a case that the difference is equal to a predetermined value or smaller than the predetermined value, project the first feature value and the second feature value into a three-dimensional lookup table, and determine whether the number of pixels around a lattice point of a three-dimensional lookup table in a desirable hue is a threshold value or more.

7. The image forming apparatus according to claim 6, wherein the circuitry is configured to
increase the amount of correction for the color conversion lookup table when the number of pixels is the threshold value or more.

8. The image forming apparatus according to claim 6, wherein the circuitry is configured to
decrease the amount of correction for the color conversion lookup table when the number of pixels is less than the threshold value.

9. An image forming method performed by an image forming apparatus, the method comprising:
storing, in a memory, a color conversion lookup table to be used when color conversion is performed from a RGB color system into a CMYK color system;
reading each of a first output product serving as a model and a second output product output from the image forming apparatus; and
correcting the color conversion lookup table,
the correcting including:
correcting the color conversion lookup table based on a number of pixels and an amount of change per hue, using read information on the first output product; and
re-correcting the corrected color conversion lookup table, using read information on the second output product.

10. A non-transitory recording medium storing a plurality of instructions which, when executed by one or more processors, causes the processors to perform an image forming method comprising:

storing, in a memory, a color conversion lookup table to be used when color conversion is performed from a RGB color system into a CMYK color system;

reading each of a first output product serving as a model and a second output product output from the image forming apparatus; and correcting the color conversion lookup table, the correcting including:

correcting the color conversion lookup table based on a number of pixels and an amount of change per hue, using read information on the first output product; and re-correcting the corrected color conversion lookup table, using read information on the second output product.

* * * * *